UNITED STATES PATENT OFFICE.

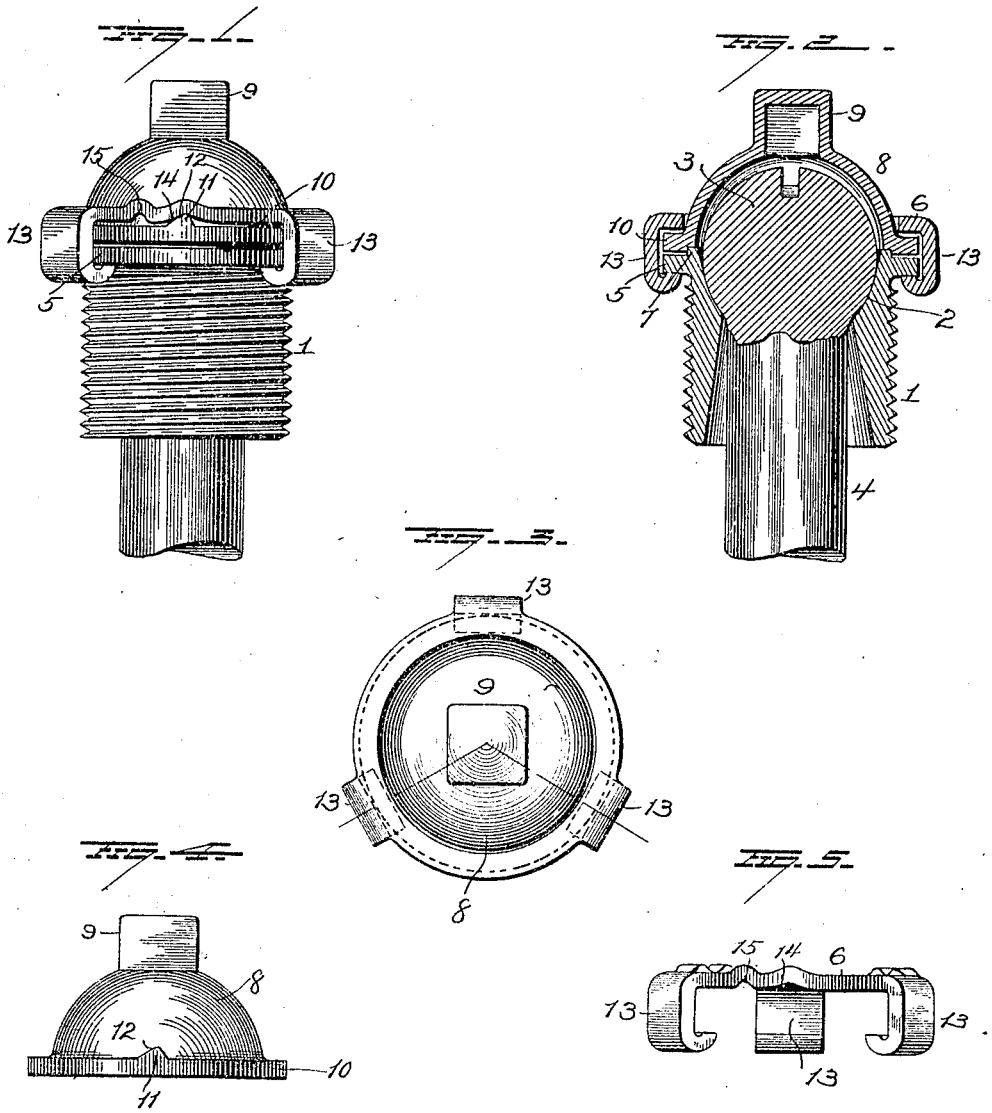

ETHAN I. DODDS, OF PITTSBURGH, PENNSYLVANIA, ASSIGNOR TO FLANNERY BOLT COMPANY, OF PITTSBURGH, PENNSYLVANIA.

STAY-BOLT STRUCTURE.

1,291,784.  Specification of Letters Patent.  Patented Jan. 21, 1919.

Application filed April 26, 1918. Serial No. 230,903.

*To all whom it may concern:*

Be it known that I, ETHAN I. DODDS, a citizen of the United States, and a resident of Pittsburgh, in the county of Allegheny and State of Pennsylvania, have invented certain new and useful Improvements in Stay-bolt Structures; and I do hereby declare the following to be a full, clear, and exact description of the invention, such as will enable others skilled in the art to which it appertains to make and use the same.

This invention relates to improvements in staybolt structures, and more particularly to the closure for the bearing sleeve, the object of the invention being to provide a simple and efficient structure which will facilitate a quick removal of the cap or closure when it is desired to gain access to the bolt for testing the same, and which will operate normally to securely retain the cap in place.

With this and other objects in view, the invention consists in certain novel features of construction and combinations of parts as hereinafter set forth and pointed out in the claims.

In the accompanying drawings; Figure 1 is a view in elevation showing my improvements; Fig. 2 is a sectional view of the same; Fig. 3 is a plan view; Fig. 4 is a separate view of the cap, and Fig. 5 is a separate view of the locking member.

1 represents a bearing sleeve threaded externally to screw through a suitable hole in a boiler sheet and provided interiorly with a curved face 2 constituting a bearing for the rounded or spherical head 3 of a staybolt 4. The bearing sleeve is provided at its outer end with an annular external flange 5 to receive the jaws of a cap securing member 6, as more fully hereinafter explained.

The outer end of the bearing sleeve is made with a seat 7 for the edge portion of a cap or closure 8, which may be made dome shaped in form, the interior configuration and dimensions of which are such as to provide suitable clearance of the head of the bolt. An angular head or enlargement 9 is formed upon the cap 8 for the reception of a wrench and said cap is provided at its peripheral portion with an annular flange 10 which overlies the flange 5 of the bearing sleeve but is spaced somewhat from the latter. The cap flange 10 is provided on its outer face with a plurality of teeth 11 spaced equi-distant apart and each tooth 11 is made with a cam face 12.

The securing member 6 is made in the form of an annular disk or ring of spring metal, which encircles the cap so as to overlie the peripheral flange 10 thereof, said securing disk or member having jaws 13 (three such jaws being shown in the drawing) provided at their free ends with lips to engage behind the annular flange 5 at the outer end of the bearing sleeve, whereby the cap will be clamped to said sleeve.

The annular disk or ring of the securing member is formed with cam portions 14 and with notches 15 to coöperate with the teeth 11 on the annular flange of the cap 8.

In assembling the parts, the cap will be placed in position on the end of the bearing sleeve with the locking member in such position that its jaws will engage behind the flange 5 of the bearing sleeve. The operator will then turn the cap so as to cause the cam portions 12 of the teeth 11 to coöperate with the cam portions 14 of the securing member and force the latter outwardly until said teeth reach the notches 15, when said teeth will snap into said notches and the cap will be securely locked upon its seat on the bearing sleeve.

It is apparent that by a reversal of the movements above described, the cap may be quickly removed to permit inspection and testing of the bolt and that it may be as quickly replaced and locked.

Having fully described my invention what I claim as new and desire to secure by Letters-Patent, is:—

1. In a staybolt structure, the combination with a bearing sleeve and a removable cap thereon, of a spring clamping member engaging said cap and sleeve, and interlocking means between said cap and clamping member..

2. In a staybolt structure, the combination with a bearing sleeve having an external flange near its outer end, of a cap to seat on said sleeve and having a flange to overlie the flange of the sleeve, a clamping member overlying the flange of the cap and having jaws to engage behind the flange of the sleeve, and coöperating means to lock the flange of the cap to said clamping member.

3. In a staybolt structure, the combination with a bearing sleeve having an external flange near its outer end, of a cap to seat on said sleeve and having an annular flange at its edge to overlie the flange of the sleeve, a tooth on the flange of the cap and having a cam portion, and an annular clamping member overlying the flange of the cap and having jaws to engage under the flange of the sleeve, said clamping member having a cam portion and a notch to coöperate with said tooth to effect temporary locking of the cap to the clamping member.

4. In a staybolt structure, the combination with a bearing sleeve having an annular flange near one end, of a cap to seat on the bearing sleeve and having an annular flange and a part adaptable for the reception of a wrench, a spring clamp encircling the cap and having jaws to engage under the flange of the sleeve, and interlocking means between the flange of the cap and said clamp.

In testimony whereof, I have signed this specification in the presence of two subscribing witnesses.

ETHAN I. DODDS.

Witnesses:
S. G. NOTTINGHAM,
R. S. FERGUSON.

Copies of this patent may be obtained for five cents each, by addressing the "Commissioner of Patents, Washington, D. C."